(12) United States Patent
Boland

(10) Patent No.: US 11,040,704 B2
(45) Date of Patent: Jun. 22, 2021

(54) WINDSCREEN WIPER DEVICE

(71) Applicant: Federal-Mogul S.A., Aubange (BE)

(72) Inventor: Xavier Boland, Arlon (BE)

(73) Assignee: Trico Belgium, Aubange (BE)

( * ) Notice: Subject to any disclaimer, the term of this patent is extended or adjusted under 35 U.S.C. 154(b) by 491 days.

(21) Appl. No.: 15/898,674

(22) Filed: Feb. 19, 2018

(65) Prior Publication Data

US 2018/0319374 A1 Nov. 8, 2018
US 2019/0061700 A9 Feb. 28, 2019

Related U.S. Application Data

(63) Continuation of application No. 12/297,945, filed as application No. PCT/EP2007/053389 on Apr. 5, 2007, now abandoned.

(51) Int. Cl.
*B60S 1/40* (2006.01)
*B60S 1/38* (2006.01)

(52) U.S. Cl.
CPC ........... *B60S 1/4003* (2013.01); *B60S 1/3868* (2013.01); *B60S 1/407* (2013.01); *B60S 1/4038* (2013.01);
(Continued)

(58) Field of Classification Search
CPC .... B60S 1/4003; B60S 1/4045; B60S 1/3865; B60S 1/3868; B60S 1/387; B60S 1/4067; B60S 1/407; B60S 1/4077; B60S 1/4074; B60S 2001/408; B60S 2001/4051; B60S 2001/4054; B60S 1/4038
(Continued)

(56) References Cited

U.S. PATENT DOCUMENTS 2,757,403 A * 8/1956 Krohm .................. B60S 1/3801
15/250.44
2,782,449 A * 2/1957 Anderson ............. B60S 1/4041
15/250.454
(Continued)

FOREIGN PATENT DOCUMENTS

DE 102004017941 A1 11/2005
EP 1623898 A 2/2006
(Continued)

*Primary Examiner* — Gary K. Graham
(74) *Attorney, Agent, or Firm* — Miller Canfield

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating arm, wherein the oscillating arm is pivotally connected to the connecting device about a pivot axis near one end, with the interposition of a joint part, with the special feature that the joint part is detachable connected to the connecting device by engaging protrusions of the connecting device, at the location of the pivot axis, in recesses provided in the joint part, and wherein the protrusions are provided with co-axial through holes.

13 Claims, 9 Drawing Sheets

(52) U.S. Cl.
CPC ........... *B60S 1/4067* (2013.01); *B60S 1/4077* (2013.01); *B60S 1/387* (2013.01); *B60S 2001/4051* (2013.01); *B60S 2001/4054* (2013.01)

(58) Field of Classification Search
USPC ............. 15/250.32, 250.43, 250.44–250.454
See application file for complete search history.

(56) References Cited

U.S. PATENT DOCUMENTS

| | | | | |
|---|---|---|---|---|
| 3,925,844 | A | * | 12/1975 | Cone .................... B60S 1/3801 15/250.44 |
| 4,608,728 | A | | 9/1986 | Sumins et al. |
| 4,852,206 | A | * | 8/1989 | Fisher ................... B60S 1/3806 15/250.201 |
| 5,065,474 | A | * | 11/1991 | Charng ................... B60S 1/40 15/250.31 |
| 6,789,289 | B2 | * | 9/2004 | Roodt ..................... B60S 1/40 15/250.32 |
| 6,792,644 | B2 | * | 9/2004 | Roodt ..................... B60S 1/40 15/250.32 |
| 8,020,246 | B2 | | 9/2011 | Bauer et al. |
| 2002/0002755 | A1 | | 1/2002 | Nacamuli |
| 2005/0172443 | A1 | * | 8/2005 | Genet .................... B60S 1/381 15/250.201 |
| 2006/0117515 | A1 | * | 6/2006 | Fink ..................... B60S 1/3853 15/250.32 |
| 2007/0067941 | A1 | | 3/2007 | Huang |
| 2008/0276404 | A1 | | 11/2008 | Bauer et al. |
| 2009/0307862 | A1 | | 12/2009 | Boland |

FOREIGN PATENT DOCUMENTS

| | | |
|---|---|---|
| FR | 2848956 | 6/2004 |
| WO | 03084790 | 10/2003 |

* cited by examiner

WINDSCREEN WIPER DEVICE

CROSS-REFERENCE TO RELATED APPLICATION

This continuation application claims the benefit of U.S. application Ser. No. 12/297,945, filed Jun. 3, 2009, which claims the benefit of PCT application No. PCT/EP2007/053389, filed Apr. 5, 2007, the entire contents of each which are incorporated herein by reference in their entirety.

BACKGROUND OF THE INVENTION

1. Technical Field

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating arm, wherein the oscillating arm is pivotally connected to the connecting device about a pivot axis near one end, with the interposition of a joint part, with the special feature that the joint part is detachable connected to the connecting device by engaging protrusions of the connecting device, at the location of the pivot axis, in recesses provided in the joint part, and wherein the protrusions are provided with co-axial through holes.

2. Related Art

Such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biassed by the carrier element, as a result of which it exhibits a specific curvature. In this prior art windscreen wiper device the joint part comprises at least one resilient tongue engaging in a correspondingly shaped hole provided in the oscillating arm, wherein the resilient tongue is rotatable along an hinge axis between an outward position retaining the wiper blade onto the oscillating arm and an inward position releasing the wiper blade from the oscillating arm. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

SUMMARY OF THE INVENTION

The object of the invention is to provide a improved windscreen wiper device.

In order to accomplish that objective, a windscreen wiper device of the type referred to in the introduction is characterized according to the invention in that the joint part is detachably connected to the connecting device by engaging protrusions of the connecting device, at the location of the pivot axis, in recesses provided in the joint part, and wherein the protrusions are provided with co-axial through holes. The connecting device acts as a base part, wherein the connecting device is preferably fixedly connected to the longitudinal strips through a welding, brazing ("soldering"), glueing or clamping operation. The essence of the present invention is that the connecting device is a universal connection part for each type of interconnection between the wiper blade and the oscillating arm. A different type of the joint part to be connected to the connecting device may be used for each different type of interconnection between the wiper blade and the oscillating arm. The advantage achieved by the invention is that a unit consisting of the wiper blade and the connecting device connected to the longitudinal strips can be manufactured for each and every type of interconnection between the wiper blade and the oscillating arm, while only a relatively cheap and easy to manufacture joint part to be connected to the connecting has to correspond with a specific type of interconnection between the wiper blade and the oscillating arm. Thus, a universal connection between the wiper blade and the oscillating arm is obtained, so that car drivers are given the possibility to buy also non-original cheap wiper blades fitting the original oscillating arms on their cars. The joint part may be connected to the connecting device through a snapping/clipping operation.

It is noted that the protrusions that function as bearing surfaces are spaced far apart, so that the forces exerted thereon will be relatively low.

In one preferred embodiment of a windscreen wiper device in accordance with the invention the joint part has an at least substantially U-shaped cross-section at the location of its connection to the connecting device, wherein the joint part in each leg of the U-shaped cross-section is provided with a recess provided coaxially with the pivot axis. More in particular, the protrusions extend outwards on either side of the connecting device, wherein the protrusions are at least substantially cylindrical. In the alternative, the protrusions are at least substantially spherical or frusto-conical.

In another preferred embodiment of a windscreen wiper device according to the invention the joint part is pivotally connected to the connecting device, wherein the protrusions of the connecting device pivotally engage in the recesses of the joint part, wherein the joint part comprises at least one resilient tongue engaging in a correspondingly shaped hole provided in the oscillating arm, wherein the resilient tongue is rotatable along a hinge axis between an outward position retaining the wiper blade onto the oscillating arm and an inward position releasing the wiper blade from the oscillating arm. The hinge axis is particularly located near an inner edge of the joint part. In the alternative the hinge axis is located near an outer edge of the joint part, as described in European patent application no. 04103735.9 of the same Applicant. In the latter case the resilient tongue is forced in the outward position under the influence of a moment in case a force is exerted on the wiper blade in a direction away from the oscillating arm. Particularly, the counterforce exerted by the oscillating arm on the resilient tongue engages at a point located behind the hinge axis, seen in the direction of the force exerted on the wiper blade. In other words, the moment of force ensures in a natural way that the resilient tongue is forced automatically in its outward position, that is its position retaining the wiper blade onto the oscillating arm. On the contrary, in the above-mentioned European patent publication no. 1 403 156 of the same Applicant the moment during use compels the resilient tongue to automatically take its inward position, thereby releasing the wiper blade from the oscillating arm, with all negative consequences involved.

In another preferred embodiment of a windscreen wiper device in accordance with the invention the oscillating arm has an at least substantially U-shaped cross-section at the location of its connection to the joint part, wherein the hole is provided in a base of the U-shaped cross-section. In addition thereto or in the alternative the joint part comprises at least two lateral resilient tongues extending outwardly, wherein the oscillating arm has an at least substantially U-shaped cross-section at the location of its connection to the joint part, and wherein each tongue engages in a correspondingly shaped hole provided in a leg of the U-shaped cross-section.

In another preferred embodiment of a windscreen wiper device according to the invention the hole(s) has/have a closed circumference. Such (a) closed hole(s) enhance (s) the retention of the connection device/joint part onto the oscillating arm in all possible directions, particularly both horizontally and vertically. In the alternative, the hole(s) has/have a non-closed circumference.

In another preferred embodiment of a windscreen wiper device in accordance with the invention the joint part is made of plastic (including any synthetic material having some flexibility).

In another preferred embodiment of a windscreen wiper device according to the invention the joint part is pivotally connected to the connecting device, wherein the protrusions of the connecting device pivotally engage in the recesses of the joint part, wherein the joint part has an at least substantially U-shaped cross-section at the location of its connection to the connecting device, and wherein the joint part comprises a recess in the base of the U-shaped cross-section for snappingly connecting the oscillating arm to the joint part. Particularly, a windscreen wiper device wherein a resilient free end of the joint part can pivot about a hinge axis for snappingly connecting the oscillating arm to the joint part.

In another preferred embodiment of a windscreen wiper device in accordance with the invention the resilient free end of the joint part can pivot about the hinge axis between a first position for mounting or dismounting a free end of the oscillating arm into or from the recess in the base of the U-shaped cross-section of the joint part, and a second position for connecting the free end of the of the oscillating arm to the joint part.

In another preferred embodiment of a windscreen wiper device according to the invention the joint part comprises at least one protrusion extending laterally from a longitudinal side of the joint part, the protrusion hooking behind a correspondingly shaped protrusion on the oscillating arm for blocking a longitudinal movement of the wiper blade with respect to the oscillating arm. In order to connect the oscillating arm to the joint part the oscillating arm is preferably pivoted relative to the joint part in an inclined position with respect to the wiper blade, so that the protrusion on the joint part is hooking behind the correspondingly shaped protrusion on the oscillating arm, wherein the oscillating arm is pivoted back relative to the joint part in a parallel position with respect to the wiper blade, so that a free end of the oscillating arm is snapped in the recess at the free end of the joint part.

In another preferred embodiment of a windscreen wiper device in accordance with the invention the connecting device is pivotally connected to the oscillating arm near its free end about a pivot axis of a transverse pivot pin provided on the oscillating arm, the pivot pin being inserted into the coaxial through holes of the protrusions of the connecting device. Particularly, the joint part has an at least substantially U-shaped cross-section at the location of its connection to the connecting device, wherein the joint part in each leg of the U-shaped cross-section is provided with a recess provided coaxially with the pivot axis, the recesses being co-axial, and wherein the pivot pin is inserted into the co-axial recesses and into the co-axial through holes of the protrusions of the connecting device.

THE DRAWINGS

The invention will now be explained in more detail with reference to figures illustrated in a drawing, wherein.

DESCRIPTION OF THE ENABLING EMBODIMENT

Figure 1:
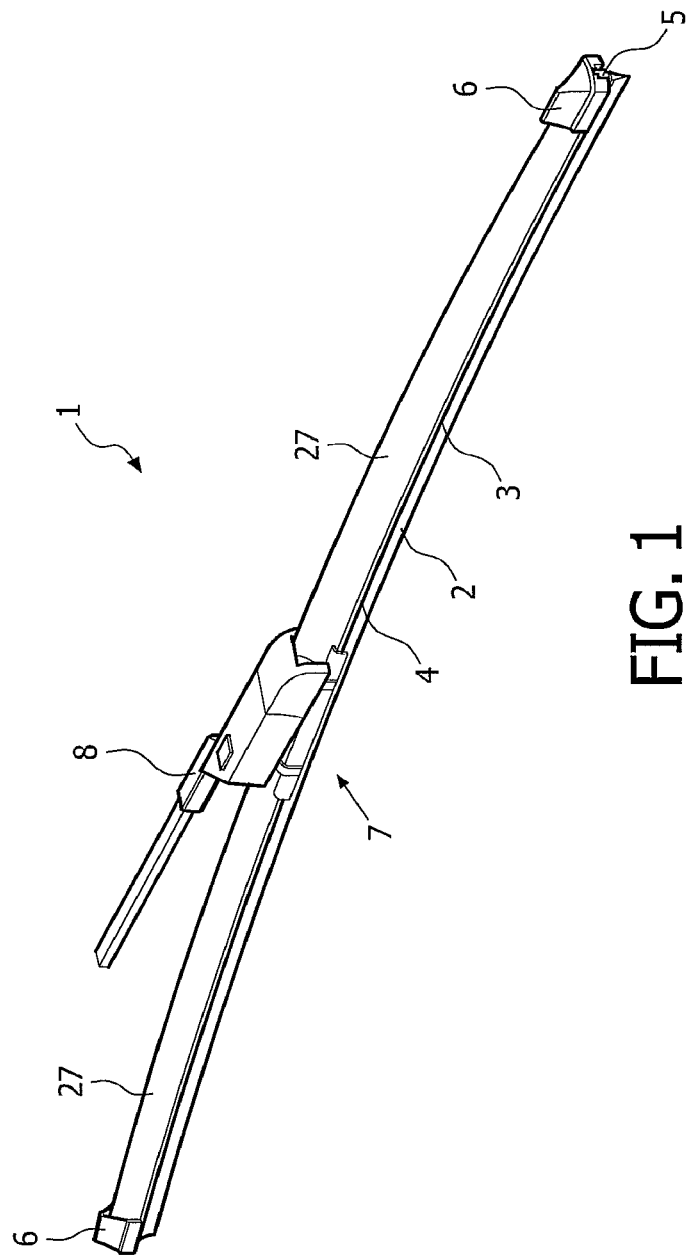
FIG. 1 is a perspective, schematic view of a preferred embodiment of a windscreen wiper device in accordance with the invention.

FIG. 1 shows a preferred variant of a windscreen wiper device 1 according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the wiper blade 2, as it were, which is thus biassed in a curved position (the curvature in operative position being that of a windscreen to be wiped). Neighbouring ends 5 of the strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having a positive fit") or force-locked to the ends 5 of the strips 4. In another preferred embodiment, the connecting pieces 6 are in one piece with the strips 4 made of spring band steel. In the latter case the connecting pieces 6 form transverse bridges for the strips 4, as it were.

The windscreen wiper device 1 is furthermore built up of a connecting device 7 of plastic material for an oscillating arm 8. Alternatively, the connecting device 7 may also be made of metal, such as steel or aluminum. The connecting device 7 is particularly welded, brazed ("soldered"), glued or clamped onto the strips 4. The oscillating arm 8 is pivotally connected to the unit about a pivot axis near one end, as will be described hereunder. The connecting device 7 is a universal part in the sense that it can be used for each and every type of interconnection between the wiper blade 2 and the oscillating arm 8, that is, for example, for the interconnection as shown is FIGS. 2, 3 and 4, respectively.

Figure 2A:
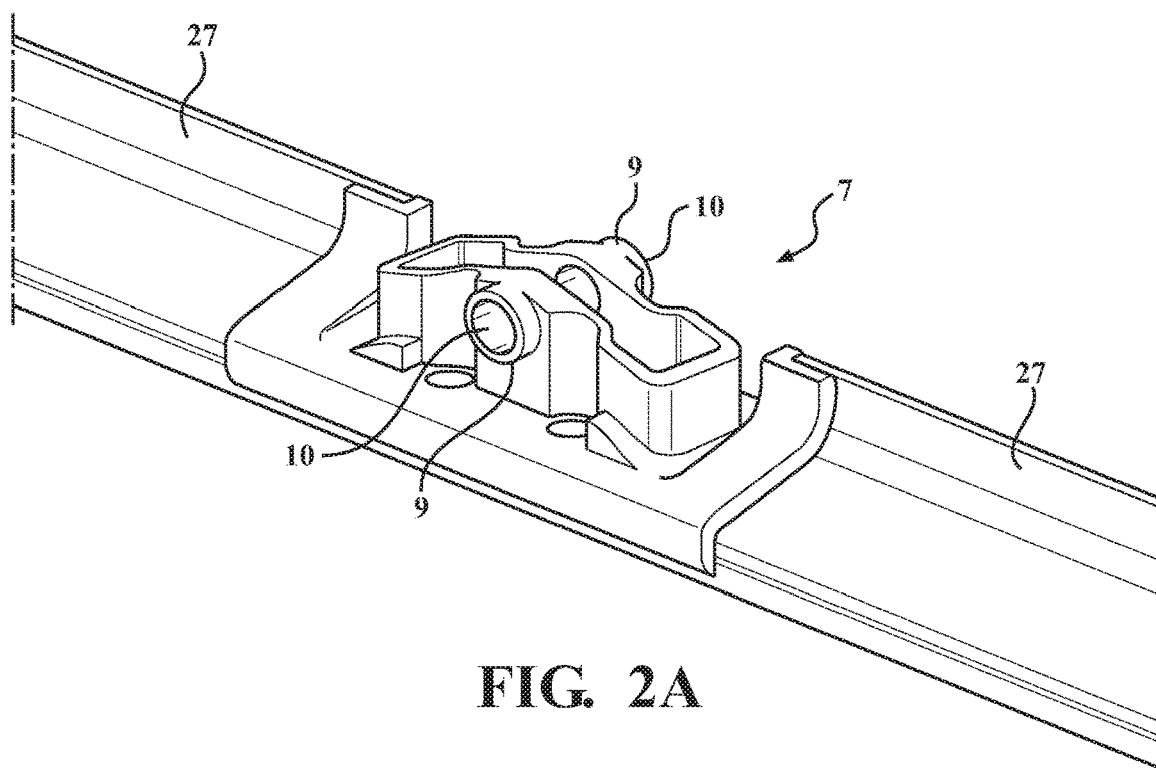
FIG. 2A is a fragmentary perspective view of a portion of the windscreen wiper device of FIG. 1 focusing on a connecting device of the windscreen wiper device.
Figure 2B:
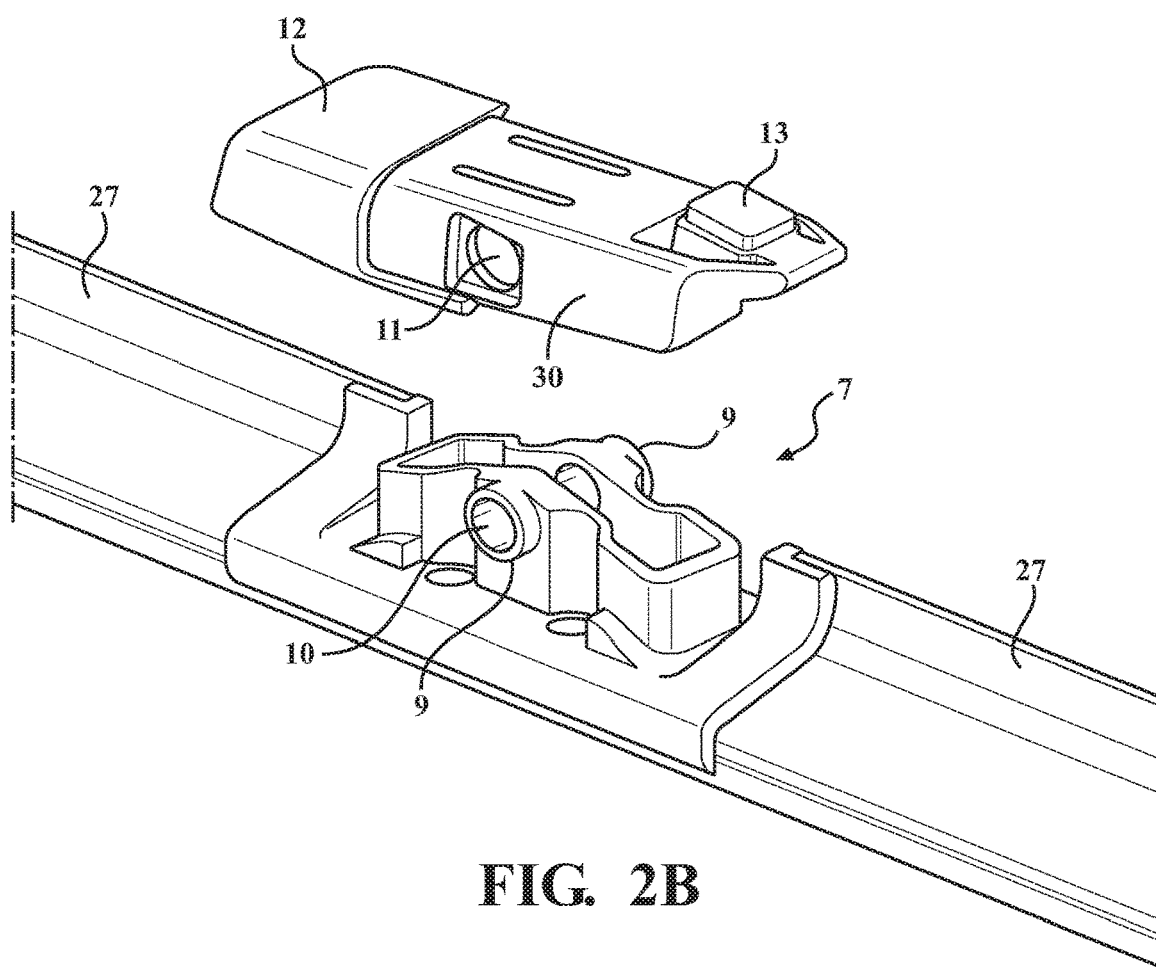
FIG. 2B is another fragmentary perspective view of a portion of the windscreen wiper device and showing a joint part being removed from the connecting device.

With reference to FIG. 2A the connecting device 7 comprises two cylindrical protrusions 9 extending outwards on either side of the connecting device 7, the protrusions 9 having co-axial through holes 10. Alternatively, the protrusions 9 may have a spherical or frusto-conical shape. These protrusions 9 pivotally engage in identically shaped cylindrical recesses 11 within side walls 30 of a plastic joint part 12 (FIG. 2B). In the alternative the recesses 11 may have a non-closed shape (i.e. open circumference). The protrusions 9 act as bearing surfaces at the location of a pivot axis in order to pivot the joint part 12 (and the oscillating arm 8 attached thereto) about the pivot axis near one end of the oscillating arm 8. The protrusions 9 are preferably in one piece with the connecting device 7.

Figure 3A:
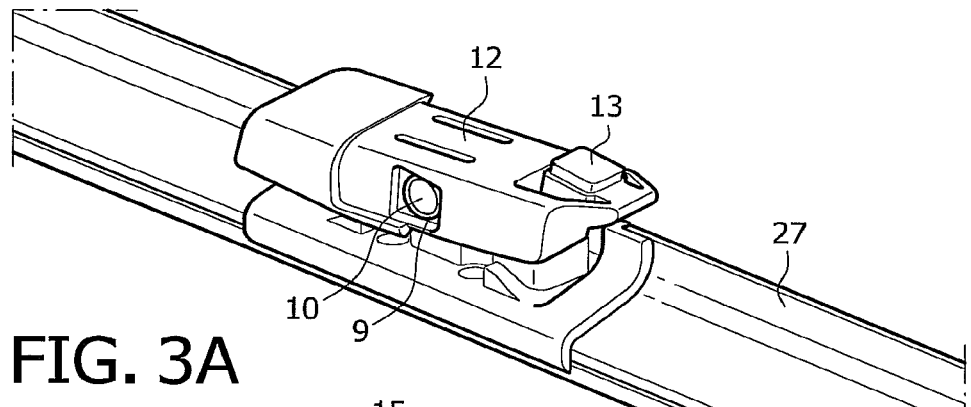
FIG. 3A is a fragmentary perspective view of the windscreen wiper device showing a first type of joint part as being attached with the connecting device.
Figure 3B:
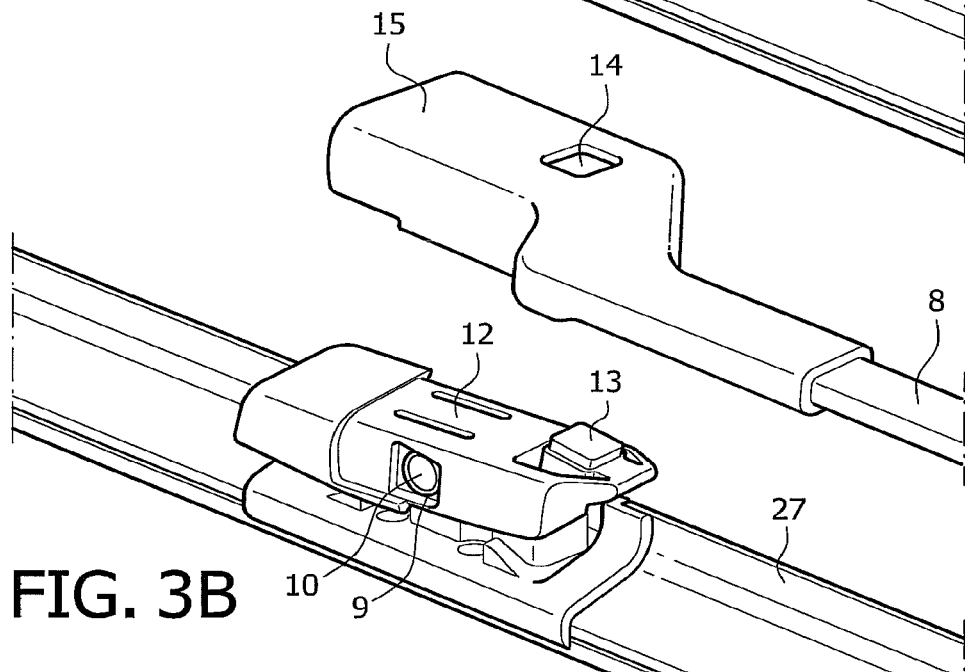
FIG. 3B is another fragmentary perspective view of the windscreen wiper device and showing a first type of oscillating arm in a pre-attached position.
Figure 3C:
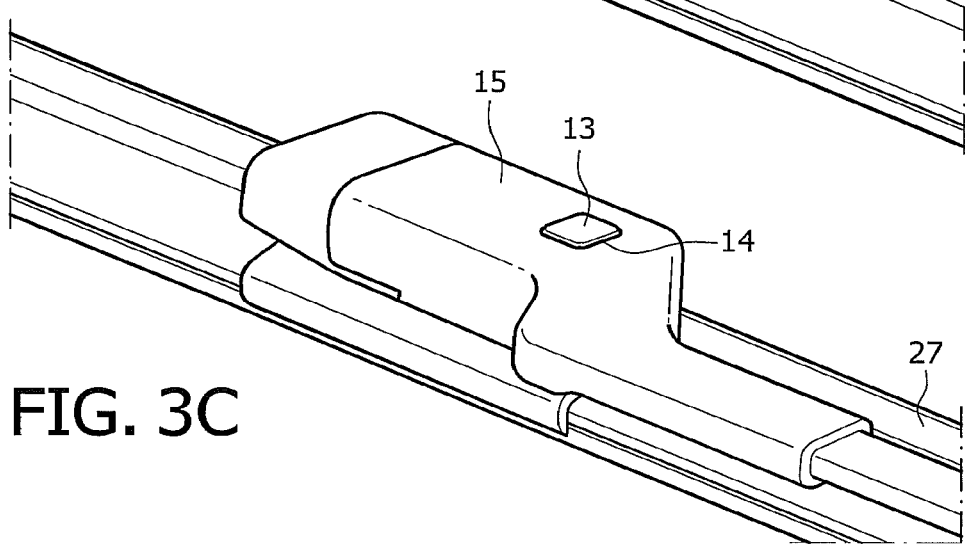
FIG. 3C is a fragmentary perspective view of the windscreen wiper device with the first type of joint part attached with the first type of oscillating arm.
Figure 4A:
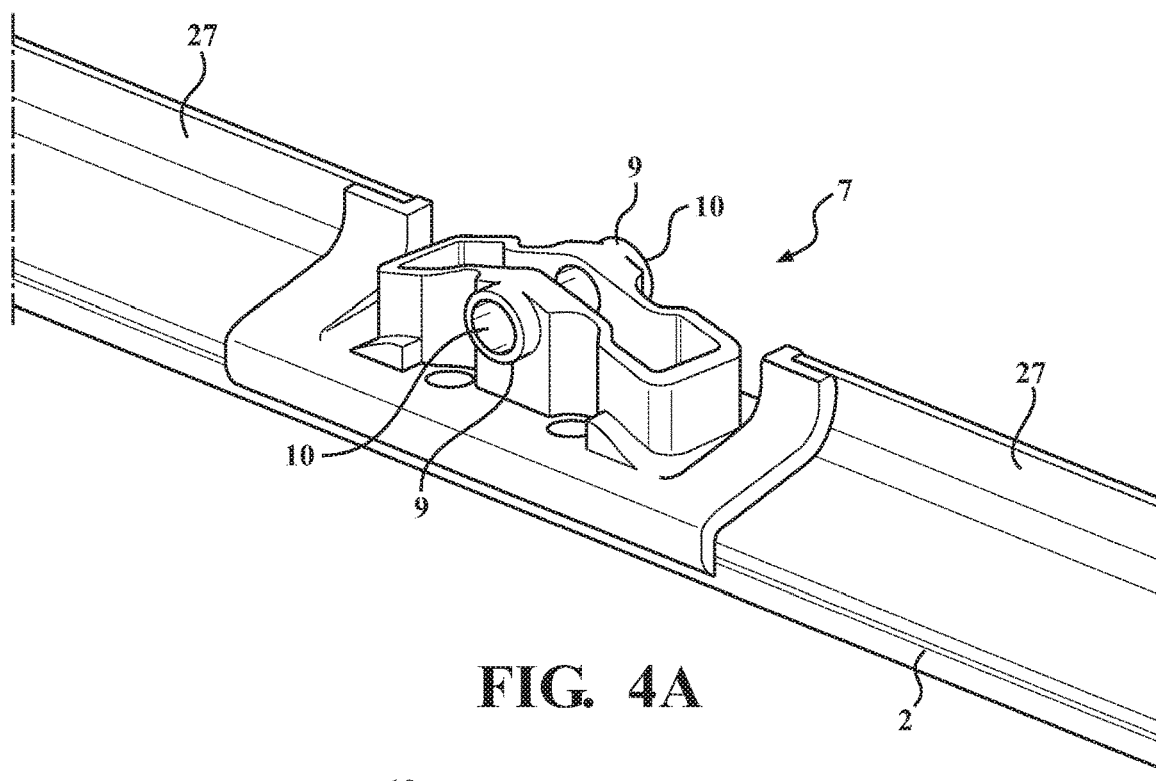
FIG. 4A is a fragmentary perspective view of a portion of the windscreen wiper device showing the connecting device.
Figure 4B:
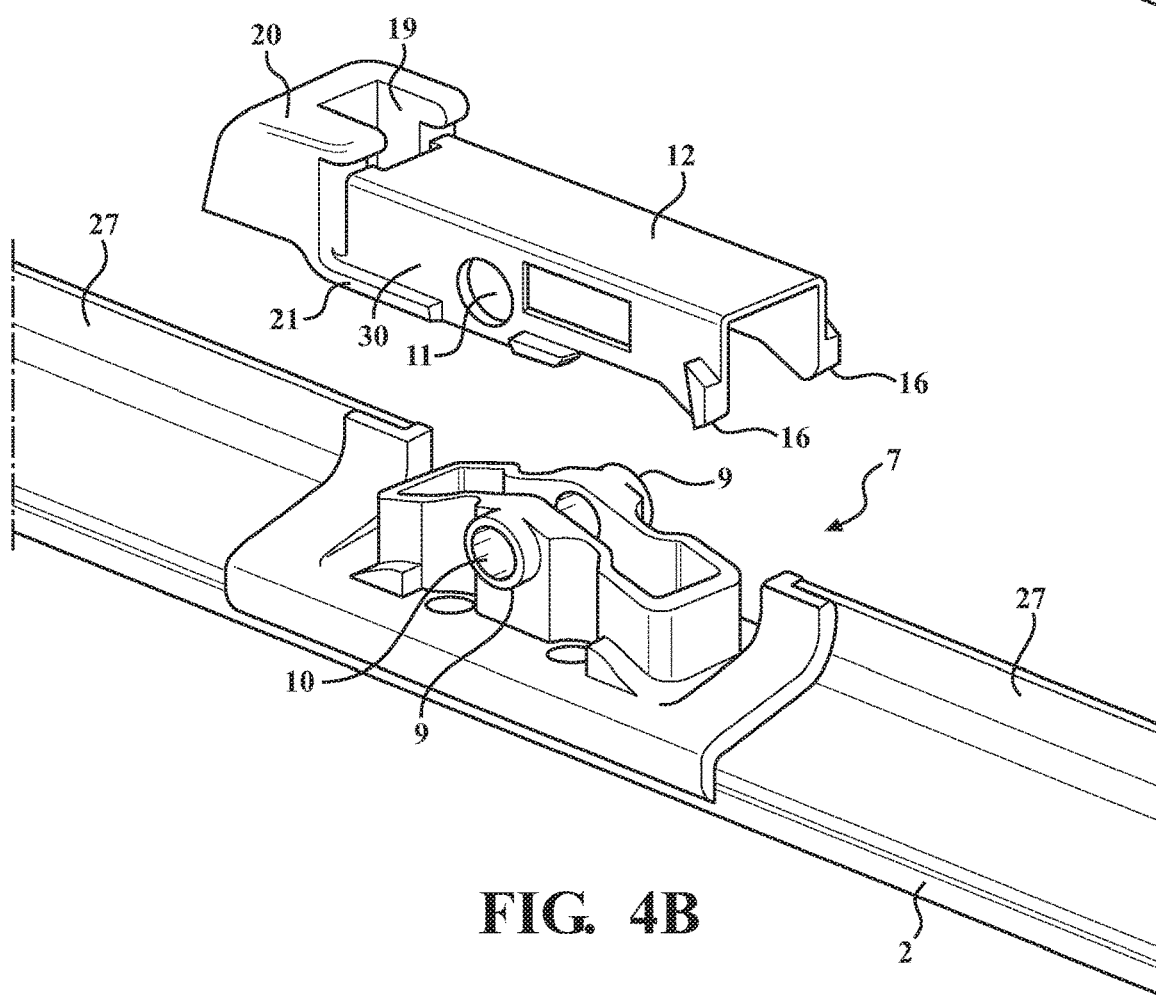
FIG. 4B is a fragmentary perspective view of a portion of the windscreen wiper device and showing a second type of joint part being removed from the connecting device.
Figure 4C:
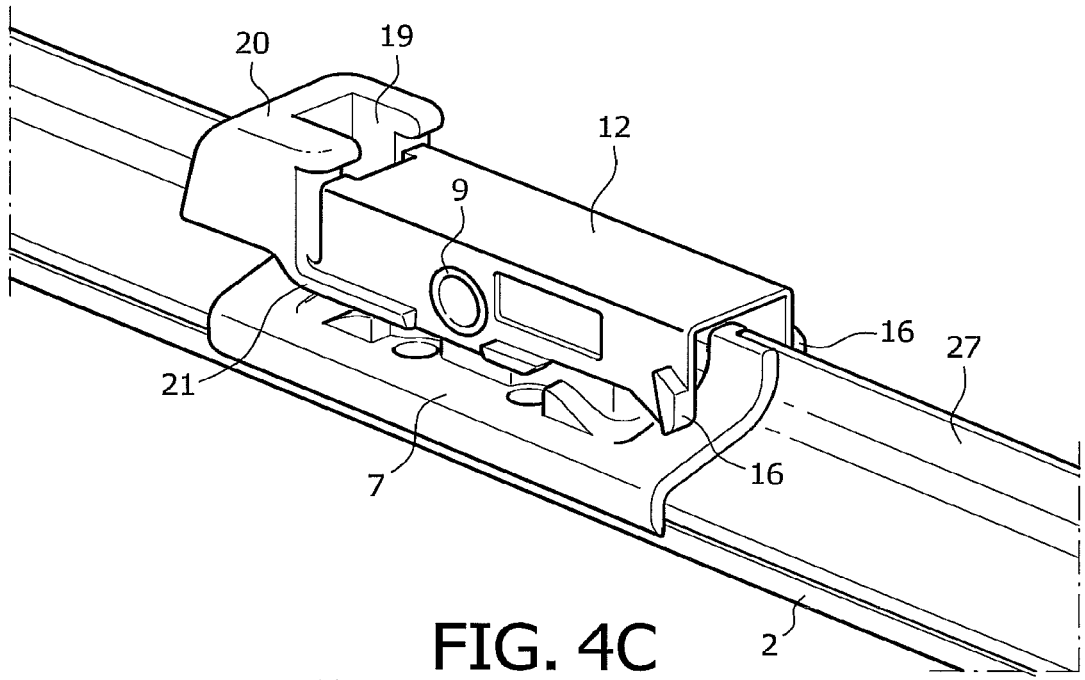
FIG. 4C is a fragmentary perspective view of the windscreen wiper device showing the second type of joint part as being attached with the connecting device.
Figure 4D:
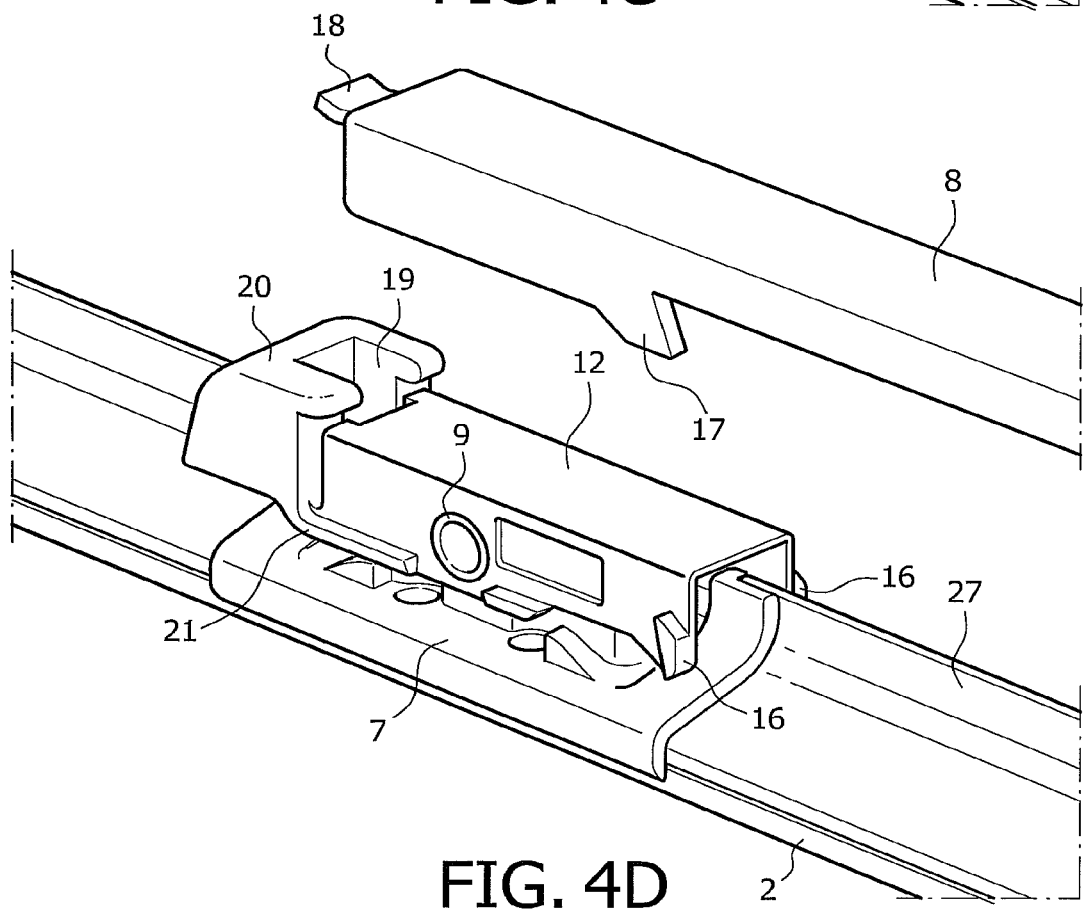
FIG. 4D is a fragmentary perspective view of the windscreen wiper device and showing a second type of oscillating arm in a pre-attached position.
Figure 4E:
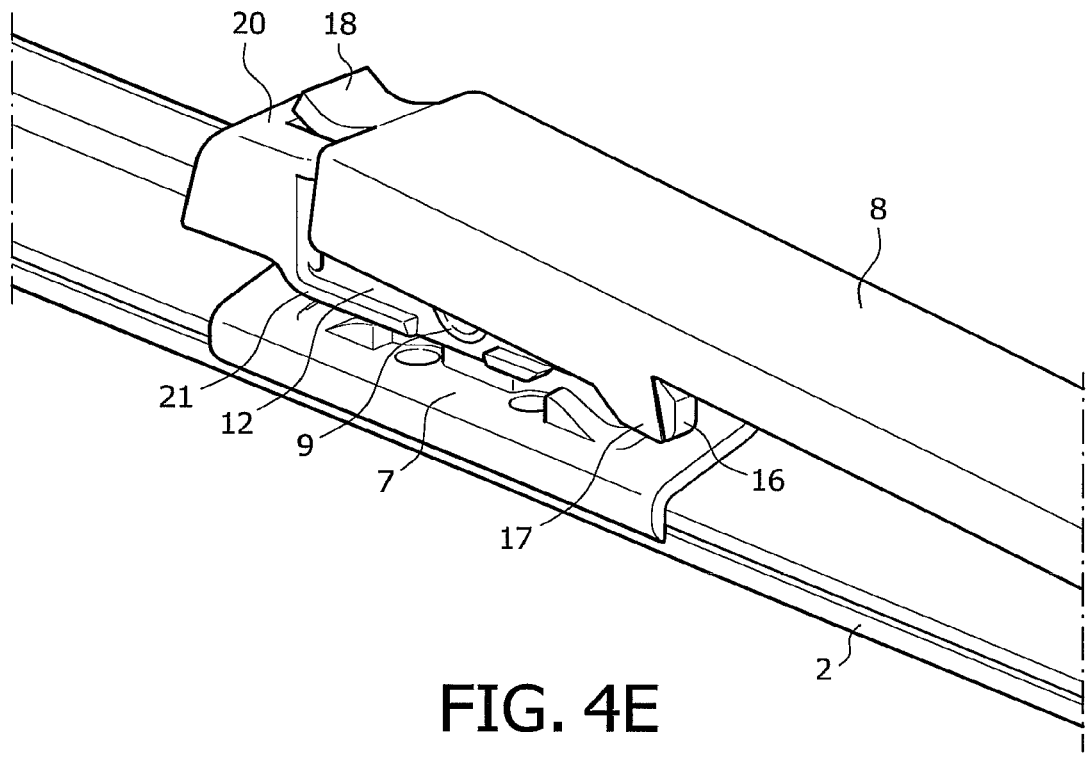
FIG. 4E is a fragmentary view of the windscreen wiper device showing the second type of oscillating arm during an attachment process with the second type of joint part.
Figure 4F:
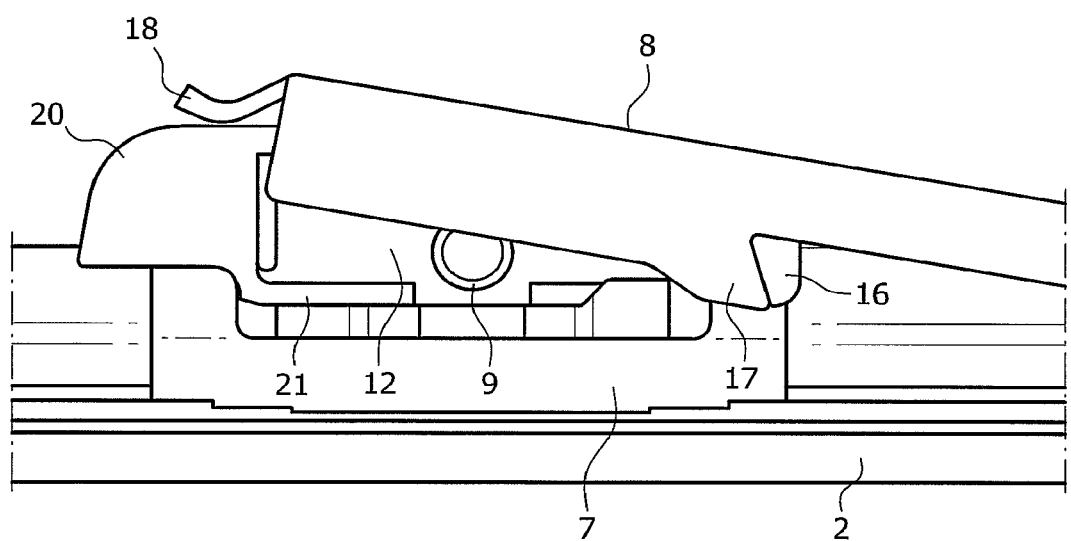
FIG. 4F is a fragmentary and front perspective view of the windscreen wiper device showing the second type of oscillating arm during an attachment process with the second type of joint part.
Figure 4G:
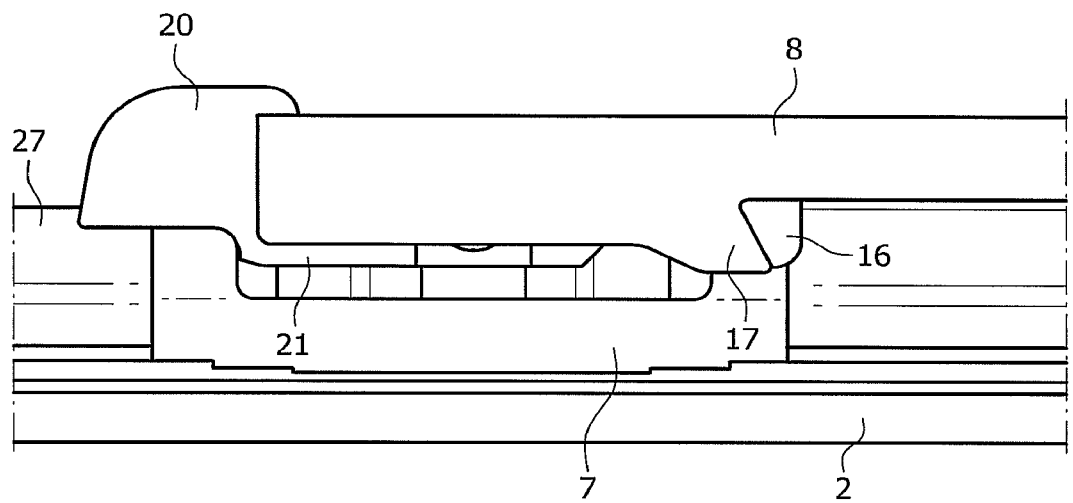
FIG. 4G is a fragmentary and front elevation view of the windscreen wiper device in attachment with the second type of oscillating arm.
Figure 4H:
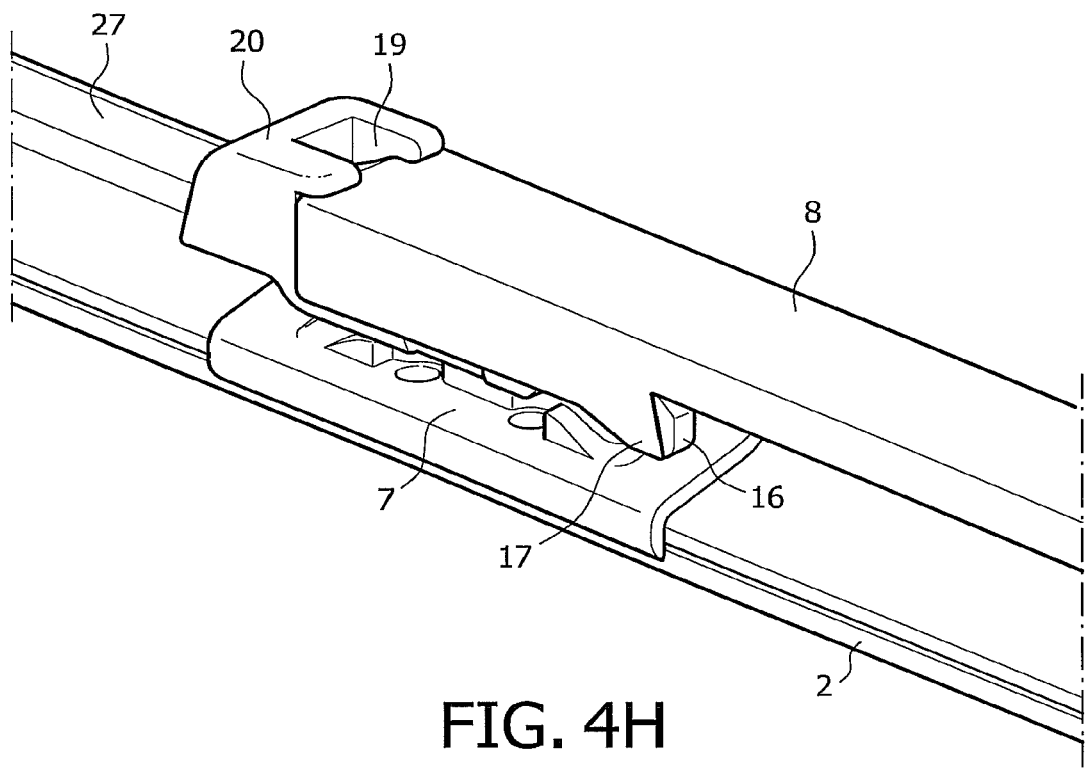
FIG. 4H is a fragmentary and perspective view of the windscreen wiper device in attachment with the second type of oscillating arm.

With reference to FIGS. 2B and 3, the joint part 12 comprises one resilient tongue 13 extending outwardly, while the oscillating arm 8 has an U-shaped cross-section at the location of its connection to the joint part 12, so that the tongue 13 engages in an identically shaped hole 14 provided in a base 15 of the U-shaped cross-section (FIG. 3B). The joint part 12 being already clipped onto the connecting device 7 is pivoted relative to the connecting device 7, so that the joint part 12 can be easily slid on a free end of the oscillating arm 8. During this sliding movement the resilient tongue 13 is initially pushed in against a spring force and then allowed to spring back into the hole 14, thus snapping, that is clipping the resilient tongue 13 into the hole 14 (FIG. 3C). This is a so-called bayonet-connection. The oscillating arm 8 together with the joint part 12 may then be pivoted back in a position parallel to the wiper blade 2 in order to be ready for use. By subsequently pushing in again the resilient tongue 13 against the spring force (as if it were a push button), the connecting device 7 and the joint part 2 together with the wiper blade 2 may be released from the oscillating arm 8. Dismounting the connecting device 7 with the wiper blade 2 from the oscillating arm 8 is thus realized by sliding the connecting device 7 and the joint part 2 together with the wiper blade 2 in a direction away from the oscillating arm 8.

Figure 5A:
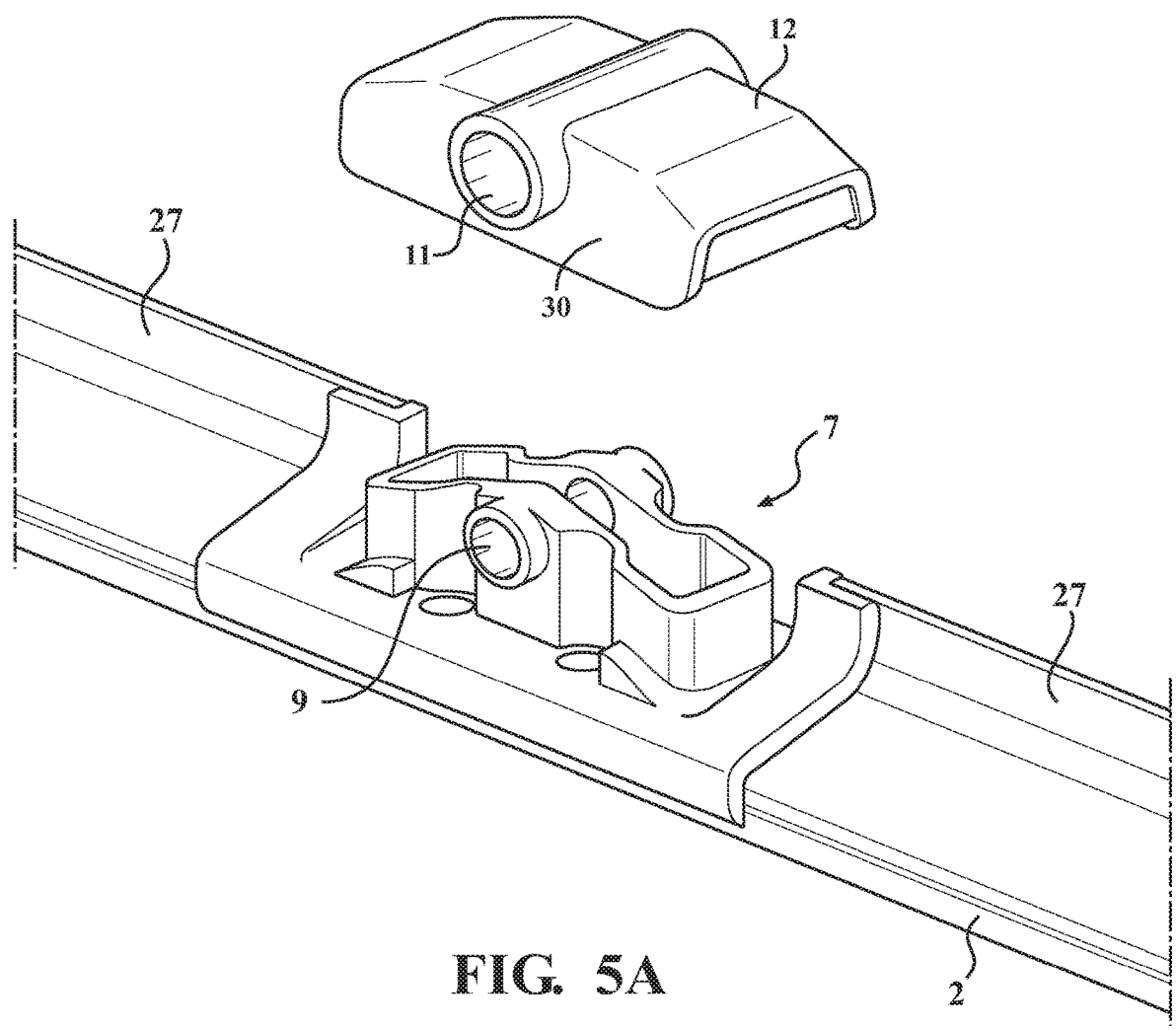
FIG. 5A is a fragmentary and perspective view of the windscreen wiper device and showing a third type of joint part being removed from the connecting device.
Figure 5B:
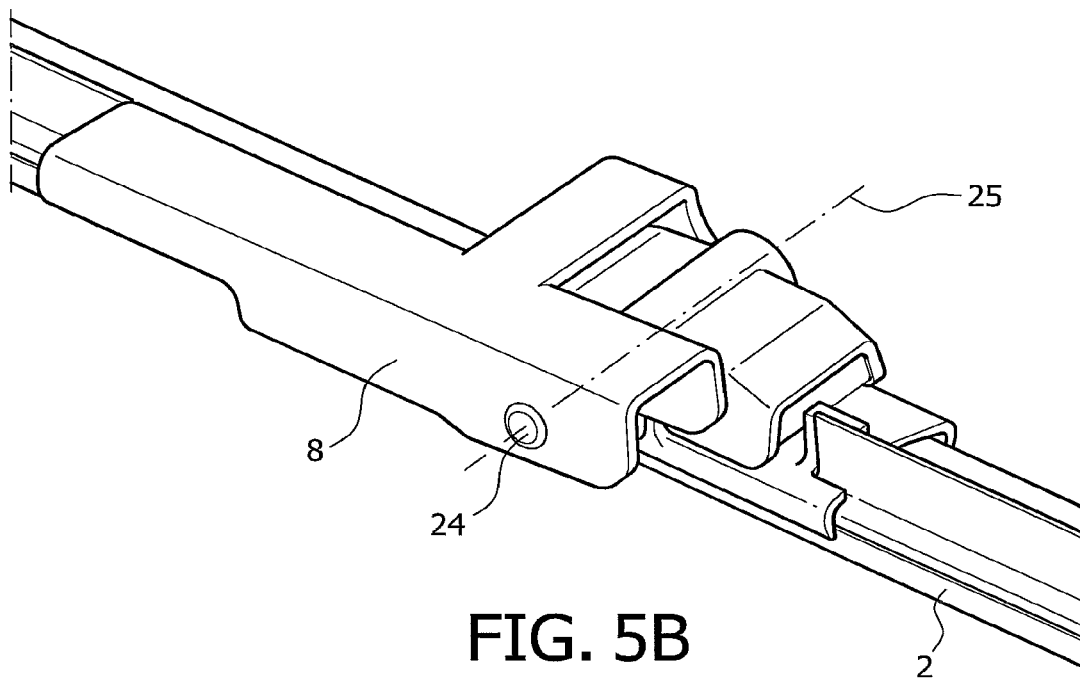
FIG. 5B is a fragmentary and perspective view of the windscreen wiper device in attachment with a third type of oscillating arm.
Figure 5C:
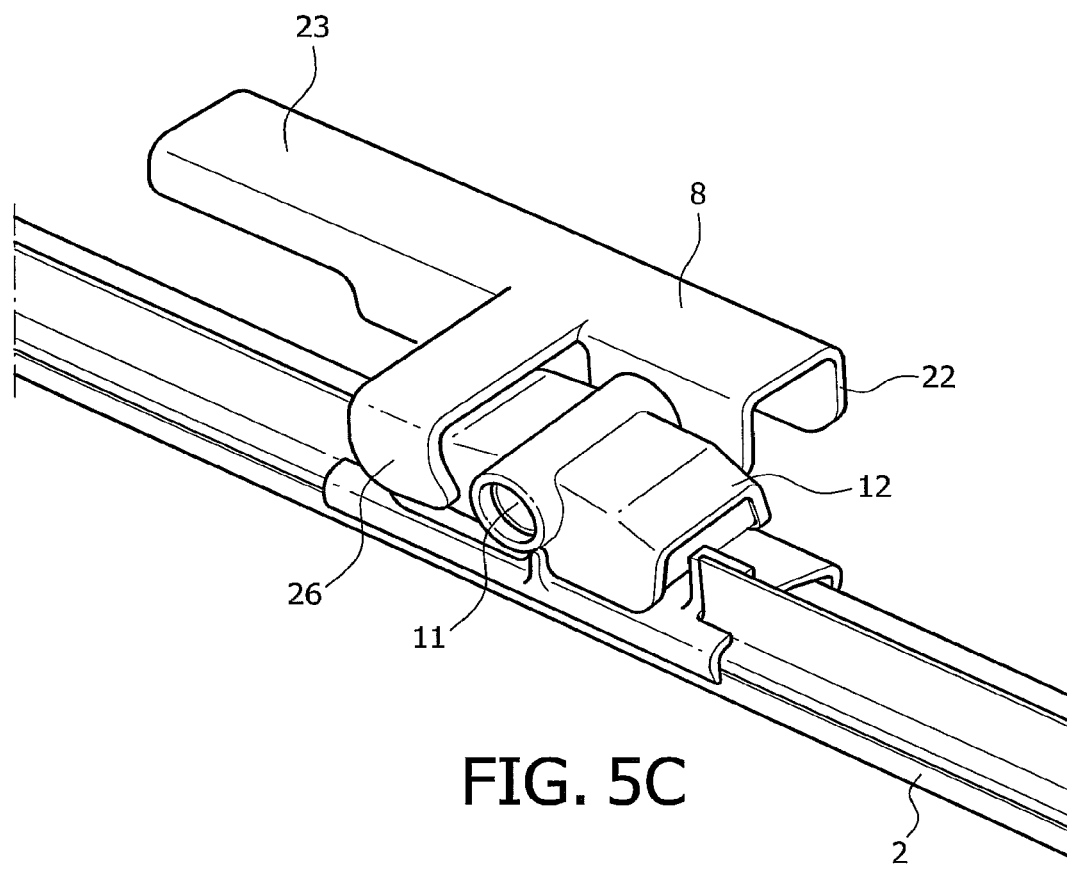
FIG. 5C is a fragmentary and perspective view of the windscreen wiper device in attachment with the third type of oscillating arm and taken from a different perspective than FIG. 5B.

FIGS. 4 and 5 correspond to FIG. 3, but now relating to a different type of joint part 12 and a different type of oscillating arm, wherein corresponding parts have been designated with the same reference numerals. A connecting device 7 as shown in FIGS. 4 and 5 is identical to the same of FIG. 2, so that the connecting device 7 is a true universal part for several types of interconnection between a wiper blade 2 and an oscillating arm 8. Actually, the embodiments of FIGS. 3 through 5 basically differ in the way the oscillating arm 8 is pivotally connected to the joint part 12. While in the embodiment of FIG. 3 a so-called bayonet-connection is used for detachably connecting the oscillating arm 8 to the joint part 12, in the embodiment of FIG. 4 a snap connection is applied for detachably connecting the oscillating arm 8 to the joint part 12, while in FIG. 5 a side connection is used for that purpose.

FIG. 4 shows the steps of mounting the wiper blade 2 onto the oscillating arm 8. Starting with the connecting device 7 being fixedly connected by gluing onto the strips 4 of the wiper blade 2 (FIG. 4A), the joint part 12 is first clipped onto the connecting device 7 (FIGS. 4B and 4C), while the oscillating arm 8 is subsequently pivoted relative to the joint part 12 in an inclined position with respect to the wiper blade 2, so that protrusions 16 each extending sidewards from a longitudinal side of the joint part 12 are hooking behind correspondingly shaped protrusion 17 on the oscillating arm 8 (FIGS. 4D and 4E). As can be seen from FIG. 4D, the oscillating arm 8 has a U-shaped cross-section at the location of its connection to the joint part 12, whereas the protrusions 17 each extend downwards from a leg of the U-shaped cross-section. Finally, the oscillating arm 8 may then be pivoted back relative to the joint part 12 in a position parallel to the wiper blade 2 (FIG. 4F). As a consequence thereof a top surface of the free end of the oscillating arm 8 together with a stiff finger 18 will be clipped/snapped in a recess 19 at a free end 20 of the joint part 12, so that the present windscreen wiper device 1 is ready for use (FIGS. 4G and 4H). By a reciprocal movement the wiper blade 2 can be released from the oscillating arm 8. The snapping movement is realized, as the free end 20 of the joint part 12 is made resiliently, so that it can pivot about a hinge axis 21 (FIG. 4F).

In the embodiment of FIG. 5 the free end of the oscillating arm 8 has a U-shaped cross-section, wherein legs 22 of the U-shaped cross-section are orientated towards a windscreen to be wiped and wherein a base 23 of the U-shaped cross-section is orientated parallel to a windscreen to be wiped. Between the legs 22 of the U-shaped cross-section and protruding in a direction towards the wiper blade 2 is a joint pin or pivot pin 24 whose pivot axis 25 extends in a direction of the oscillating movement of the oscillating arm 8. The diameter of the pivot pin 24 is adapted to the diameter of the bearing bores or through holes 10 in the connecting device 7 and to the diameter of the recesses 11 of the joint part 12, the through holes 10 and the recesses 11 being co-axial. In order to secure or retain the connecting device 7 (and thus the wiper blade 2) onto the oscillating arm 8 the oscillating arm 8 is provided with an extension comprising the pivot pin 24 and a L-shaped shoulder 26 which projects out in the direction of the pivot pin 24 and across the wiper blade 2 and at the free end of which is disposed a leg facing the windscreen.

Possibly, a spoiler 27 is furthermore present being made in one piece with the wiper blade 2.

The invention is not restricted to the variants shown in the drawing, but it also extends to other embodiments that fall within the scope of the appended claims.

What is claimed is:

1. A windscreen wiper device, comprising:
an elongated carrier element having spaced apart longitudinal strips;
a wiper blade made of a flexible material and which can be placed in abutment with a windscreen to be wiped and said wiper blade including opposing longitudinal grooves on its longitudinal sides;
said longitudinal strips being disposed in said longitudinal grooves of said wiper blade;
neighboring ends of said longitudinal strips being interconnected by a respective connecting piece;
a connecting device secured with said carrier element and having protrusions;
a joint part having a pair of side walls wherein each of said side walls includes a recess passing therethrough, wherein said joint part is pivotably attached with said connecting device by receiving said protrusions of said connecting device at a pivot axis in said recesses of said joint part;
said protrusions being formed as one piece with said connecting device and having outer bearing surfaces and having co-axial through holes with inner bearing surfaces to present an axially extending opening across said connecting device; and
a pin-style wiper arm that has a transverse pin and an L-shaped shoulder which projects in the same direction as said transverse pin, wherein said transverse pin extends through said co-axial through holes of said protrusions of said connecting device and wherein said L-shaped shoulder embraces said joint part.

2. The windscreen wiper device as set forth in claim 1 wherein said joint part is detachably connectable with said connecting device through a snapping/clipping operation.

3. The windscreen wiper device as set forth in claim 1 wherein said connecting device is made of a monolithic piece of plastic.

4. The windscreen wiper device as set forth in claim 1 wherein said joint part is made of a monolithic piece of plastic.

5. The windscreen wiper device as set forth in claim 1 wherein said connecting device is welded, glued, or clamped onto said longitudinal strips of said carrier element.

6. The windscreen wiper device as set forth in claim 1 further including a pair of sub-spoilers which are made as separate pieces from one another and which extend longitudinally from said connecting device to said respective connecting pieces.

7. A windscreen wiper assembly, comprising:
a pin-style wiper arm including an end piece with a body portion and a transverse pin and an L-shaped shoulder which extend in a lateral direction away from said body portion;
said L-shaped shoulder having a vertical leg which is spaced from said body portion;
a windscreen wiper device operably connected with said pin-style wiper arm;
said windscreen wiper device having a wiper blade of a flexible material and having a pre-curved carrier element which biases said wiper blade into a curved configuration;
a connecting device secured with said carrier element and having a pair of laterally outwardly extending protrusions, each of said protrusions having an outer bearing surface and an inner bearing surface which surrounds a through hole, and said through holes being co-axially aligned with one another;
a joint part having a pair of side walls and a top surface, each of said side walls having an opening, said protrusions of said connecting device being received in said openings of said side walls of said joint part to pivotally connect said joint part with said connecting device; and
said transverse pin of said pin-style wiper arm extending through said co-axially aligned through holes of said connecting device and said L-shaped shoulder straddling said joint part such that said vertical leg is in contact with one of said side walls and said body portion is in contact with the other of said side walls.

8. The windscreen wiper assembly as set forth in claim 7 wherein said connecting device is made as of a monolithic piece of plastic.

9. The windscreen wiper assembly as set forth in claim 7 wherein said joint part is made of a monolithic piece of plastic.

10. The windscreen wiper assembly as set forth in claim 7 wherein said connecting device is welded, glued or clamped onto said strips of said carrier element.

11. The windscreen wiper assembly as set forth in claim 7 wherein said carrier element includes a pair of longitudinal strips.

12. The windscreen wiper assembly as set forth in claim 11 wherein neighboring ends of said longitudinal strips are connected with respective end caps.

13. The windscreen wiper assembly as set forth in claim 12 further including a pair of sub-spoilers which are made as separate pieces from one another and which extend longitudinally from said connecting device to said respective end caps.

* * * * *